Nov. 20, 1951  K. REINER  2,575,594
GANG NUT RETAINER ASSEMBLY
Filed Sept. 28, 1945
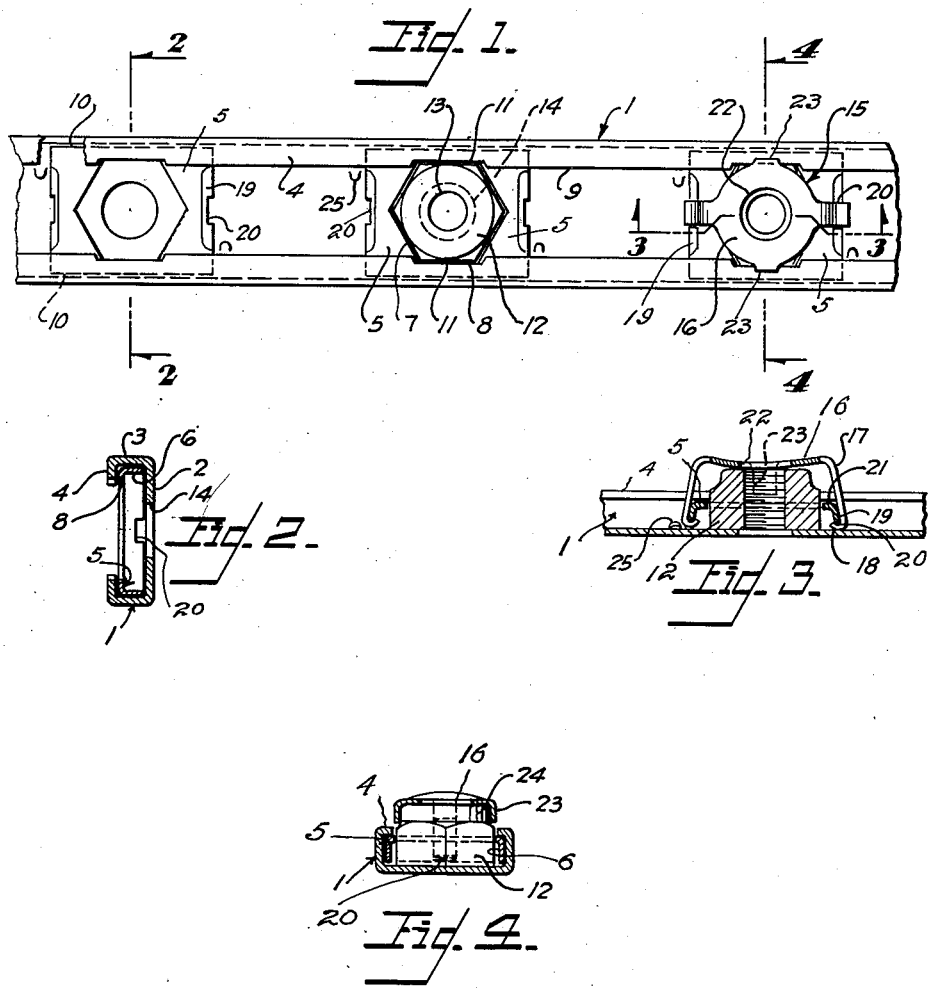
INVENTOR.
Kenneth Reiner
BY
Francis D. Ammen
his ATTORNEY

Patented Nov. 20, 1951

2,575,594

UNITED STATES PATENT OFFICE 2,575,594

GANG NUT RETAINER ASSEMBLY

Kenneth Reiner, Los Angeles, Calif.

Application September 28, 1945, Serial No. 619,194

3 Claims. (Cl. 85—32)

This invention relates to means for holding a series of nuts or similar fastening devices in spaced relation with respect to each other, and so that they will be held against rotation when bolts are applied to their threaded openings. Devices of this kind are now in use to assist in rapidly attaching parts to structures, usually structures that include a plate or flange to which bolts are to be applied for securing or supporting an object, such as a bracket, an accessory, or the like, in place.

It is a common practice to employ a channel in devices or assemblies of this kind, in which the nuts are carried and held substantially in alignment with openings through the channel, and the bolts, when inserted through the supporting plate, pass through the openings in the channel and are then rotated to secure them in the nuts that are held in the channel. While it is necessary to have the threaded opening in the nut substantially align with the opening in the channel that carries the nuts, it is desirable to provide structures of this kind with means for permitting a certain amount of "lateral shift" or lost movement of the nuts so as to enable the nuts to adapt themselves to the precise position of the bolt when inserted through the bolt opening in the channel.

One of the objects of this invention is to present a gang nut retainer assembly of simple construction to be used for the purpose indicated, and to operate as a time saver in making assemblies of certain structures.

The channels referred to carry the nuts spaced apart from each other, and of course, require a considerable amount of metal because the width of the channel must be considerably greater than the width (measured across the flats) of the nuts carried by it.

One of the objects of this invention is to provide means whereby the flanges of these channels can be so formed that they will enable the overall width of the channel to be reduced, thereby effecting a saving of metal; and also to provide a construction or co-ordination of structure of the channels and the nuts that will enable the channels to perform either or both of two functions, one of which is to prevent the rotation of the nuts, and the other is to provide means for limiting the movement of the nuts longitudinally in the channel so as to facilitate their threaded openings being brought into line with the bolt when inserted through the plate to which the assembly is attached.

Another object of the invention is to provide an assembly of this character which will include a nut carrier or carriage for each nut, which lies in the channel but without fitting accurately to the channel width so as to enable the nut lying on the carriage to have a possible shift or adjustment, or lost motion, substantially at right angles to the longitudinal axis of the channel; and also to provide means associated with the channel for establishing or providing for lost motion or "shift" for the nut in a direction longitudinal to the channel. In this way each nut can very readily be shifted sufficiently to enable its threaded opening to align with the inserted bolt.

In an assembly of this character it is necessary to provide means for preventing the nuts from falling out of the channel when they are being transported, as by shipment, or when being carried up onto the work where they are to be attached to the "job"; and one of the objects of this invention is to provide time saving means for facilitating the assembly of the nuts into the channel and securing of the same against falling out of the channel; and further, to provide means for effecting this, which does not require any special tools for putting the same in place, but which is capable of cooperating with a part or parts in the assembly to enable the piece that holds the nut against falling out of the channel, to be applied by a simple movement, the parts being constructed so that the attachment is effected by what I call a "snap action," that is to say, the part that holds the nut from falling out of the channel can be merely pushed against the nut, so that resilient means carried by it will snap into position and thereafter hold the nut in place.

Another object of the invention is to provide an assembly of this kind with means engaging the side of the nut at a distance from its base for preventing the nut from turning when the bolt is screwed into it.

Further objects of the invention will appear hereinafter.

The invention consists in the novel parts and combinations of parts to be described hereinafter, all of which contribute to produce an efficient gang nut retainer assembly.

A preferred embodiment of the invention is described in the following specification, while the broad scope of the invention is pointed out in the appended claims.

In the drawing:

Figure 1 is a plan of a short section of a channel such as referred to. This channel is represented as broken away and in it a nut assembly corresponding to each nut position is illustrated in three stages of assembly.

Figure 2 is a vertical section taken on the line 2—2 of Figure 1, and illustrating the assembly in its first stage, at which time the carrier for the nut is in place in the channel, but in this view the nut and the means for holding the nut in place are omitted.

Figure 3 is a section taken on the line 3—3 of Figure 1, and passing through all of the parts employed in the complete assembly at the location of one of the nuts.

Figure 4 is a cross-section taken on the line 4—4 of Figure 1 but showing the nut itself in elevation. This view further illustrates details of the completely assembled parts at one of the nut locations.

Referring more particularly to the parts, and especially to Figure 1, the assembly includes a channel 1 generally formed of thin sheet metal, and includes a back plate or web 2, the edges of which are provided with outwardly or forwardly projecting flanges 3. These flanges are usually disposed substantially at right angles to the plane of the web 2 and they terminate at their outer edges in inturned strips, which I call keeper strips 4, because these strips operate to keep the carriers or carriage 5 in place in the channel.

The carriers 5 are in the form of substantially rectangular plates, the side edges of which are formed with downwardly or inwardly extended flanges 6, the edges of which rest substantially against the upper face of the web 2. These flanges are of sufficient width to hold the body portion of the carrier 5 substantially against the inner faces of the keeper strips 4.

Each carrier plate 5 is provided with a nut socket 7 which, in the present instance is of hexagonal form, but of course, it should be understood that this nut socket can be square, octagonal, or of any other form. However, this nut socket is preferably disposed so that it presents side edges 8 as indicated in Figures 1 and 2, which are substantially parallel with the side edges of the channel 1. The distance between the side edges 8 is great enough to enable them to lie back under the extreme edges 9 of the keeper strips 4.

Referring particularly to the left end of Figure 1, it will be noted that the width of the carrier plates 5 is less than the distance between the side flanges 3 of the channel so that a clearance space 10, as indicated in Figure 1, is presented at each side of each carriage. At the location of each nut along the channel, the keeper strips 4 are provided with notches 11. These notches are slightly longer than the length of the side face of each nut, in other words, there is a sloppy fit at this point which permits a slight shifting movement of each nut 12 when it is in place.

In Figure 1 the middle portion of the figure shows the carrier plate 5 in position and with the nut in place. The nut is set down from above into the channel so that it fits into the nut socket 7 and so that two of its side edges, which are opposite to each other, lie in the oppositely disposed notches 11. And when the nut is in place in this way its threaded opening 13 will be more or less in axial alignment with a larger opening 14 that is formed in the web 2 to allow plenty of clearance for the shank of the bolt when it comes into the channel from the back.

I provide means to be applied to the nut after it is set in place in the manner suggested, for preventing it from falling out of its carrier 5 to which it has been applied. This means is of a character that will enable it to be snapped into position in engagement with the carrier plate 5, and preferably is in the form illustrated at the right end of Figure 1, and further illustrated in Figures 3 and 4; I call this member a cap-member 15. It preferably has a disk form body 16 which is provided on diametrical points with two outwardly and downwardly extending resilient fingers 17. This plate or disk body 16 is dished downwardly, for example as shown in Figure 3, that is to say, the disk preferably has a concavo-convex form, the elements of which extend transversely to the direction in which the channel extends, and from the edges of this concavo-convex part of this cap-member the fingers 17 extend downwardly; and their lower ends are formed into spurs or hooks 18 that incline upwardly and inwardly to facilitate their snapping into their holding position.

To cooperate with these hooks I provide the transverse edges of the carriers 5 with downwardly projecting, and slightly recessed, flanges 19, the lower edges of which are provided with notches or sockets 20. At the point where the flanges 19 unite with the body portion 5 of each carrier, I prefer to provide a rounded shoulder 21. When the cap-members 15 are put in place the body 16 is held in position just above or outside of the outer face of the nut 12, and it is then forced downwardly on the nut with the spring fingers 17 in line with the sockets 20. In doing this the hooks 18 snap down over the shoulders 21 and move along down the flanges 19 until they snap into the sockets or notches 20. When this occurs the more or less resilient disk bodies 16 will be placed in stress, so that the upper face of the nut is exerting an upward thrust against the convex under face of the disk 16. This develops a force tending to swing the fingers 17 inwardly toward the axis of the nut and keeps the hooks 18 tightly placed in their sockets 20.

In order to enable each cap-member 15 to be properly centered on the nut so that the central opening 22 through it will always be properly centered with the nut opening 13, I prefer to provide the side edges that are disposed toward the keeper strips 4 with two short integral ears 23 that project downwardly at the side of the nut. In the present instance the nut I employ is formed with a button 24 on its upper end portion which is of cylindrical form, and these short ears 23 project down and lie closely against the side of these buttons 24.

While the notches 11 operate to limit the shifting movement of the nuts and their carriers, if desired, additional means may be provided for cooperating directly with carriage plates 5 to limit their movement along the channel. In Figure 1 I illustrate means for this purpose which consists of small transversely disposed tongues 25 that are struck up into the channel from the web 2 so that their upper portions are in the path of the carrier plate. One of these tongues is illustrated in Figure 3 located at each side of the carrier plate.

When my invention is in use and when the bolt is pushed against the nut, if the nut is an unusually shallow nut, so that it might be lifted out of its socket in the nut carrier, the nut would still be prevented from turning by the engagement of the sides of the nut with the notches 11. In this way the notches 11 function as an independent means for preventing rotation of the nuts in the channel.

Many other embodiments of this invention may be resorted to without departing from the spirit of the invention.

I claim as my invention:

1. In a gang nut retainer assembly, the combination of a channel for supporting a plurality of nuts, said channel having a web with side flanges projecting out from the web, and terminating in inwardly turned keeper strips, said keeper strips having spaced notches in their edges, nut-carriers spaced from each other in the channel, with side edges extending under said keeper strips and retained thereby in the channel, each of said carriers having a nut receiving opening conforming to the shape of the nut, nuts freely receivable in said openings, said nuts having oppositely disposed side faces received in said notches, and held by said notches against unlimited movement along said channel, and attachable means for retaining the nuts in said openings.

2. In a gang nut retainer assembly, the combination of a continuous channel for supporting a plurality of nuts, said channel having a web with side flanges projecting out from the web, and terminating in inwardly turned keeper strips, said keeper strips having spaced notches in their edges, nut-carriers spaced from each other in the channel, with side edges extending under said keeper strips and retained thereby in the channel, each of said carriers having a nut receiving opening conforming to the shape of the nut, nuts freely receivable in said openings and having oppositely disposed side faces received in said notches, said notches being slightly longer than the sides of the nuts to permit a limited shifting movement of said nuts and carriers along the channel, and attachable means for retaining the nuts in said openings.

3. A gang nut retainer according to claim 1, in which said attachable means includes a cap member seated on the outer end portion of each nut, said nut carrier and its corresponding cap member having cooperating means for attaching the cap-member to the carrier.

KENNETH REINER.

REFERENCES CITED

The following references are of record in the file of this patent:

UNITED STATES PATENTS

| Number | Name | Date |
| --- | --- | --- |
| 1,706,820 | Reck | Mar. 26, 1929 |
| 2,144,553 | Simmonds | Jan. 17, 1939 |
| 2,249,923 | Whitcombe | July 22, 1941 |
| 2,299,158 | Luce | Oct. 20, 1942 |
| 2,333,386 | Murphy | Nov. 2, 1943 |